Feb. 20, 1951   J. A. ZINN, JR   2,542,298
METHOD AND APPARATUS FOR MAKING
LAMINATED PACKAGING BLANKS
Filed Feb. 3, 1948   7 Sheets-Sheet 1

INVENTOR.
Julius A. Zinn, Jr.,
BY Mason & Wyss
Attys.

Feb. 20, 1951    J. A. ZINN, JR    2,542,298
METHOD AND APPARATUS FOR MAKING
LAMINATED PACKAGING BLANKS

Filed Feb. 3, 1948    7 Sheets-Sheet 3

INVENTOR.
Julius A. Zinn, Jr.
BY Mason & Wyss
Atty's

Patented Feb. 20, 1951

2,542,298

UNITED STATES PATENT OFFICE 2,542,298

METHOD AND APPARATUS FOR MAKING LAMINATED PACKAGING BLANKS

Julius A. Zinn, Jr., Chicago, Ill.

Application February 3, 1948, Serial No. 5,917

14 Claims. (Cl. 93—36.6)

1

The present invention relates to methods and apparatus for making packaging blanks and more particularly to an improved method and improved apparatus for forming sheet backing material and sheet lining material into a laminated packaging blank which is adapted to be formed into a sealed package.

The value of employing sealed containers in packaging certain consumer commodities, particularly liquids and foods, has long been recognized in the packaging art. Such containers must be air and moisture tight and when designed to contain liquid commodities, must also be impervious to the packaged liquid. Paper containers or packages designed to meet these requirements are generally of two types, i. e., those which are coated with wax or another sealing material after the cartons are formed, and those constructed of a laminated stock consisting of an outer backing material, usually cardboard, laminated with an inner lining material, such, for example, as a metallic foil, waxed paper, or the like, which is relatively much more impervious to air, moisture and liquids generally, than the outer backing material. Known methods and apparatus for making packages of the latter type are not satisfactory for the reason that both in the blank forming stage and in the formation of the blank into a package, certain operations are conventionally performed which result in air and fluid leakage paths being inadvertently formed through various wall sections of the completed package. Thus, when prelaminated stock is used in making the package blanks, it is very difficult to perform the required operations on the laminated stock before cutting the blanks without damaging the lining lamination. For example, it is almost impossible to score the blank for the purpose of forming the necessary fold lines thereon and then fold along these lines to form the package, without breaking or tearing the lining lamination at points along these lines. Moreover, many of the lining materials having the most desirable characteristics from the standpoint of the sealing and non-contaminating properties thereof, are extremely impervious to liquid adhesives and hence are very difficult to adhere together or to any other surface. As a result, if such lining materials are used, there is great likelihood of package failure at the junction surfaces of those portions of the package blank which are overlapped and adhered together as the package is formed; this for the reason that at least one layer of the lining material is always interposed between the overlapped sections of the

2 backing material throughout such overlapped portions of the blank. Further, certain edges of the usual packaging blank are always exposed to the package contents after the blank is formed into a package and filled. This means that if a laminated blank is used, certain raw edges of the outer paper backing material are exposed to the package contents, with the result that if the package is liquid filled, the liquid may be absorbed into the backing material and cause package failure. Because of the above-mentioned and other problems, and the lack of adequate solutions therefor in known methods and apparatus for making laminated packages, such packages of this type as have been produced commercially have been quite expensive and have never been found entirely satisfactory for use in packaging liquids.

It is an object of the present invention, therefore, to provide an improved method and improved apparatus for making laminated packaging blanks which may be formed into packages without introducing the above-mentioned defects into the completed package.

It is another object of the invention to provide an improved method and apparatus for making laminated packaging blanks which permits all of the usual operations, such as printing, scoring and the like, to be performed on the blank while insuring that the lining material will not be damaged as these operations are performed.

It is still another object of the invention to provide an improved method and improved apparatus of the character described which may be utilized to manufacture laminated packaging blanks on a high speed production basis with a minimum of operator attention.

The invention, both as to the present improved apparatus and the present improved methods, will best be understood by reference to the following specification, taken in connection with the accompanying drawings, in which.

In general, the improved laminated package blank herein disclosed is formed by separately performing certain preliminary operations on the backing and lining materials, adhering the two materials together to form a composite sheet or laminated stock, and then cutting the blanks from the laminated stock. The described steps are continuously performed on a progressive stage basis, and one feature of the present invention is concerned particularly with separately edge perforating the backing and lining materials as they come off the supply reels in order that the edge perforations may be utilized to synchronize the operations performed on the backing and lining materials at succeeding stages of the blank forming apparatus. In accordance with another feature of the invention, the lining material is perforated over those areas of each blank which are adapted to be facingly engaged and adhered together in forming the blank into a package, thereby to obviate the above-described problem of obtaining a secure bond between two facing lining material surfaces or between facing surfaces of the lining material and backing material. In those particular instances where portions of the blank are overlapped to sandwich two layers of lining material between two pieces of backing material, the perforations through the two engaging layers of lining material are arranged to register with each other, thereby to permit direct adhering of the overlapped pieces of backing material together. In this regard, it is noted that the term "perforation," as used herein with particular reference to the lining material of each blank, is intended broadly to cover any and all types of openings of whatever size and configuration (such, for example, as round, oval, rectangular, or square) which will permit overlapped segments of the backing material to be directly adhered together in forming the blank into a package. In accordance with still another feature of the invention, when lining materials of certain types, such for example, as aluminum foil, are used which have but little elasticity and tend to tear or break when stretched, the lining material of each blank is adhered to the backing material only over areas which are marginally spaced from the score or fold lines of the blank, thereby to prevent the lining material from being torn or punctured as the blank is folded into the desired package configuration. In accordance with a still further feature of the invention, those edges of the blank which are adapted to be exposed to the package contents upon formation of the blank into a package are sealed by impregnating the same with a suitable sealing material; this for the purpose of preventing liquid absorption into the backing material when the blank is formed into a package and filled with a liquid or any material having a liquid constituent.

Figure 1:
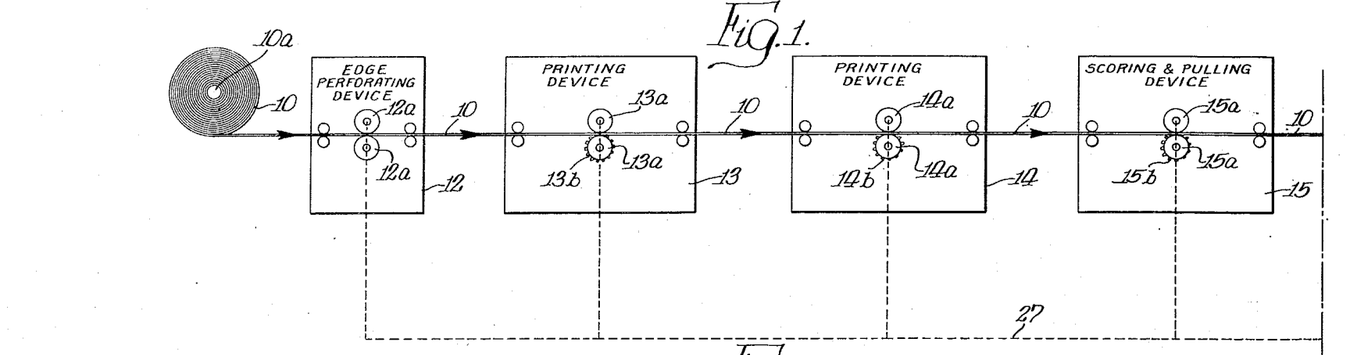
Figs. 1, 2, and 3 when laid end to end in the order named diagrammatically illustrate package blank forming apparatus characterized by the features of the present invention.
Figure 2:
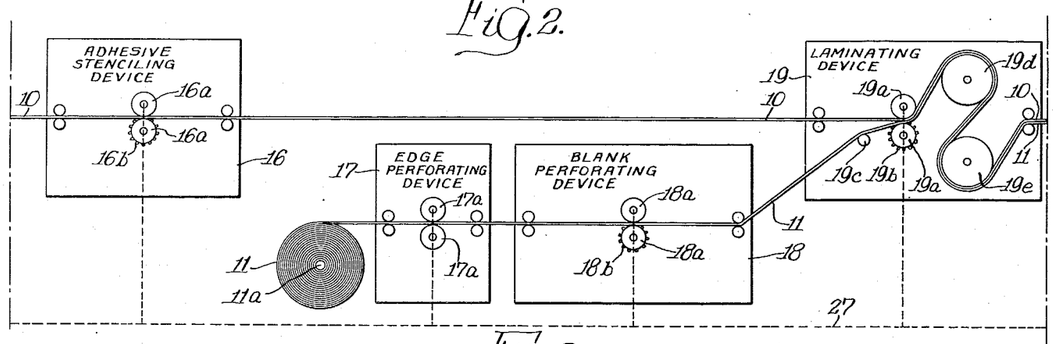
Figure 3:
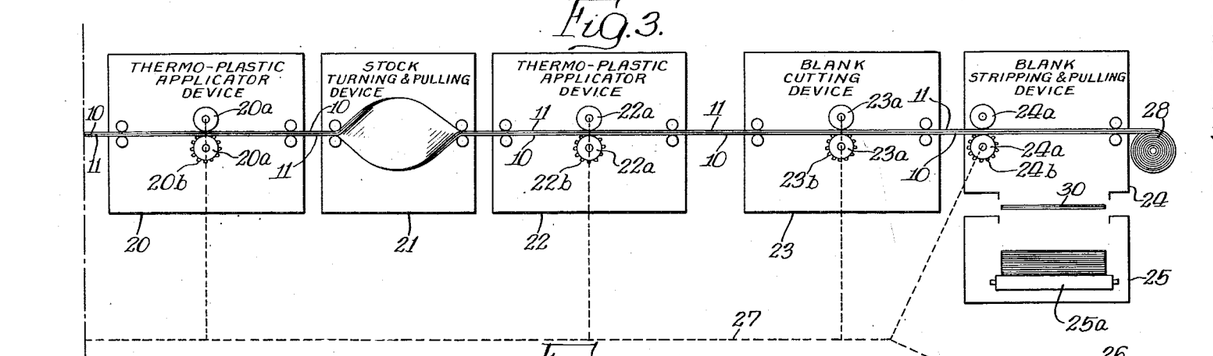

Referring now to the drawings and more particularly to Figs. 1, 2, and 3 thereof, the improved apparatus there illustrated is adapted to be used in the production of laminated packaging blanks which may be formed into packages of the particular construction described and claimed in Zinn Patent No. 2,412,666, granted December 17, 1946. It will be understood from the following explanation, however, that the present invention is not limited to the formation of blanks of the particular configuration disclosed, but may be successfully employed in the production of blanks of other configurations adapted to be formed into packages of any desired construction and configuration. Briefly considered, the apparatus illustrated in Figs. 1, 2, and 3 of the drawings comprises a plurality of tandem related devices, 12, 13, 14, 15, and 16 for performing certain preliminary operations on the package blank backing material 10 as this material is unreeled from a supply reel 10a, a plurality of devices 17 and 18 for performing certain preliminary operations on the package blank lining material 11 as this material is unreeled from a supply reel 11a, a laminating device 19, and a plurality of additional devices 20, 21, 22, 23, and 24, for performing certain final operations upon the laminated backing and lining materials after the two materials are adhered together in the laminating device 19. More specifically, the backing material, which may, for example, comprise a heavy paper, a composite or laminated paper, or semi-stiff cardboard having its long fibers running the length of the stock, is fed from the reel 10a directly into a roll or rotary type edge perforating device 12 having the function of producing edge perforations along the outer edges of the stock which are utilized in so synchronizing the operations performed at the successive stages that the package blank areas of the two materials over which these operations are performed are maintained in absolute registry throughout the apparatus. From the edge perforating device 12, the backing material 10 is successively fed between the printing rolls 13a and 14a of two tandem related roll or rotary type printing devices 13 and 14. At this point, it is noted that as many printing devices as desired may be employed to inscribe the desired printing upon the top surface of the backing material. Thus, if two-color printing is desired, two printing devices or stages will ordinarily be employed, whereas if three-color printing is required, three printing devices or stages will be required. Upon leaving the last printing device 14, the backing material 10 is fed between the scoring rolls 15a of a roll or rotary type scoring and pulling device 15 having the function of producing the score or fold lines required to facilitate formation of the completed blanks into packages. As pointed out more fully below, the scoring dies carried by the rolls 15a are so arranged that predominantly the score lines for each blank are formed by deforming the backing material 10 downward, although certain predetermined ones of the score lines are formed in the reverse manner by deforming the backing material stock upward as viewed in Fig. 1 of the drawings. From the scoring device 15, the backing material 10 is fed between the adhesive stencilling rolls 16a of a roll or rotary type stencilling device 16 having the function of applying a liquid adhesive material to the under side of the backing material only over those areas to which the lining material 11 is to be adhered to the backing material. Upon leaving the adhesive stencilling device 16, the backing material 10 is fed into the laminating device 19 where a pair of laminating rolls 19a bring the backing material into facing engagement with the lining material 11 and adhere the two materials together over the areas to which the adhesive material is applied by the stencilling device.

As indicated above, the lining material stock 11 is in rolled sheet form. This material is of the same width as the backing material 10 and may consist of cellophane, any of the well known liquid-repellent plastic films, such for example, as Pliofilm, or a metallic film such as tin foil or aluminum foil, depending upon the particular type of use to which the packages formed from the completed blanks are to be put. As the lining material is withdrawn from the reel 11a, it is first fed between the perforating rolls 17a of a roll or rotary type edge perforating device 17 to have edge perforations formed therein along either side of the stock. These edge perforations have the same spacings transversely and longitudinally of the lining material 11 as the edge perforations formed by the perforating device 12 in the backing material 10. As it leaves the edge perforating device 17, the lining material 11 is fed between the perforating rolls 18a of a roll or rotary type blank perforating device 18 where the perforations required to insure bonding of the backing materials together in forming the completed blanks into packages are produced. Upon leaving the blank perforating device 18, the perforated lining material 11 is fed between the laminating rolls 19a of the laminating device 19 beneath the backing material 10 to be adhered to the under side of the backing material. Following lamination of the two materials 10 and 11 between the rolls 19a, the laminated stock passes around a pair of cooling rolls 19d and 19e forming a part of the laminating device 19. These rolls perform the function of cooling and setting the adhesive material employed in adhering the two materials together. After exiting from the laminating device 19, the laminated stock is fed between a pair of thermoplastic or adhesive applicator rolls 20a embodied in a roll or rotary type thermoplastic applicator device 20, wherein a certain predetermined area within the boundaries of each blank is given a coating of thermoplastic adhesive material. This material is applied to the under side of the laminated blank, i. e., to the lining material 11 and through certain predetermined perforations in this material to the under side of the backing material 10. Upon exiting from the applicator device 20, the laminated stock is fed through a stock turning device 21 having the function of turning the stock over so that the lining material 11 is disposed above the backing material 10. The purpose of this stock side reversing step will become more fully apparent from the following detailed explanation of the mode of operation of the apparatus. From the stock turning device 21, the laminated stock is fed between the applicator rolls 22a of a second roll or rotary type thermoplastic applicator device 22 which has the function of coating certain predetermined areas within the boundaries of each blank with a thermoplastic adhesive material. In this case, the adhesive material is applied to the under surface of the backing material 10 by the lowermost applicator roll 22a, the particular material used being the same as that employed at the applicator stage 20. After leaving the thermoplastic applicator device 22, the laminated stock is fed between a pair of blank cutting rolls 23a embodied in a roll or rotary type blank cutting device 22 where the laminated stock is cut through along the blank boundaries. Following this cutting operation, the laminated stock is fed between a pair of stripping rolls 24a embodied in a roll or rotary type blank stripping and pulling device 24. These rolls perform the function of stripping the formed blanks from the laminated stock. As the blanks, one of which is indicated at 30, are stripped from the laminated stock they are ejected or dropped onto a conveyor belt 25a embodied in a stacking device 25 where they are stacked for conveyance to an edge sealing station, not shown. The laminated stock scrap, upon exiting from the blank stripping device 24, is preferably rolled up on a reel 28 in convenient form for shipment as scrap material.

All of the above-described devices 12, 13, 14, 15, 16, 17, 18, 19, 20, 21, 22, 23, 24, and 25 are well known in the art and accordingly have only been shown schematically in the drawings. In actual practice, these devices form parts of one complete machine having a common bed or frame and common driving means. It is significant to point out that each of the devices 12 to 20, inclusive, 22, 23, and 24 is of the roll or rotary type such that movement of the materials 10 and 11 through the machine may proceed continuously at any speed within the operating capabilities of the machine.

For the purpose of operating the described devices 12 to 20, inclusive, 22, 23, and 24, common driving means 26, preferably comprising a constant speed electric motor, are provided. This motor, which may be geared down to operate at any desired speed is also geared or sprocket and chain connected, as indicated by the dashed line 27, to drive at least the operation performing roll or rolls of each of the devices 12 to 24, inclusive, in synchronism, such that the areas operated upon at successive stages of the apparatus are positionally related to each other in the proper manner. In this regard and as the following explanation will show, perfect registration or positional displacement of the areas operated upon, both as regards the backing material and the lining material in advance of lamination and in respect to the operations performed on the laminated stock, is essential to satisfactory operation of the described apparatus. To achieve this end, the edge perforations formed in the backing material 10 by the edge perforating device 12 and in the lining material 11 by the edge perforating device 17 are employed to obtain and maintain the desired positional relationship between the areas operated upon at the various stages of the apparatus. Specifically, the edge perforations of the backing material 10 are indexed with the teeth of driving sprockets 13b, 14b, 15b, and 16b which are rotated with the lower rolls 13a, 14a, 15a, and 16a of the devices in which these rolls are respectively embodied. Similarly, the edge perforations of the lining material 11 are indexed with the teeth of driving sprockets 18b which are rotated with the lower roll 18a of the blank perforating device 18. Further to the same end, the edge perforations of both the backing material 10 and the lining material 11 are indexed with the teeth of driving sprockets 19b, 20b, 22b, 23b, and 24b which are rotated with the lowermost rolls of the devices 19, 20, 22, 23, and 24, respectively. In order that the described sprockets, in the engagement of their teeth with the edge perforations of the two materials 10 and 11, may have full control of the feed at each operational stage, a certain amount of material slack is preferably provided between each adjacent pair of devices in which the above-described printing, scoring, adhesive-stencilling, thermoplastic adhesive applicating, blank cutting and blank stripping operations are performed.

Figure 1A:
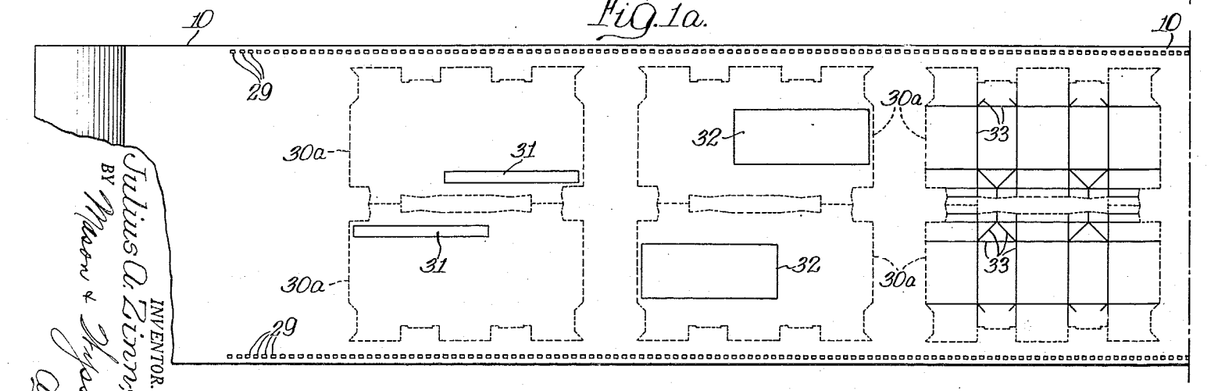
Figs. 1a, 2a, and 3a when laid end to end in the order named ilustrate in plan view the operations performed at the various stages of the apparatus shown in Figs. 1, 2, and 3.
Figure 2A:
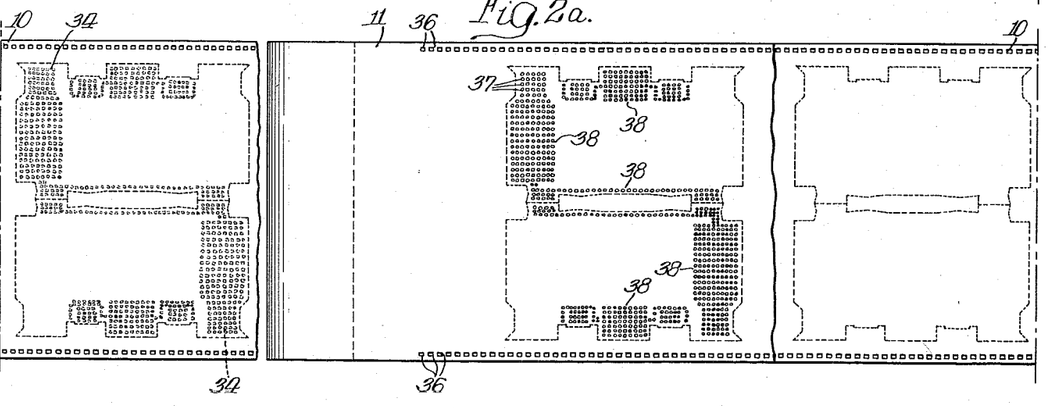
Figure 3A:
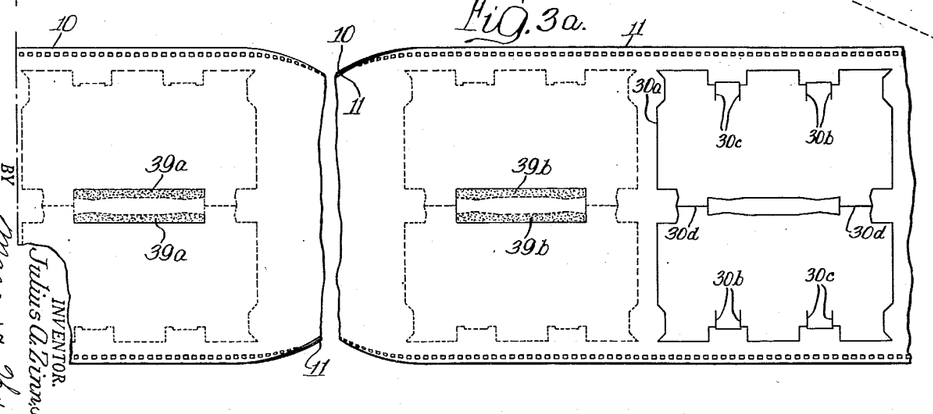
Figure 4:
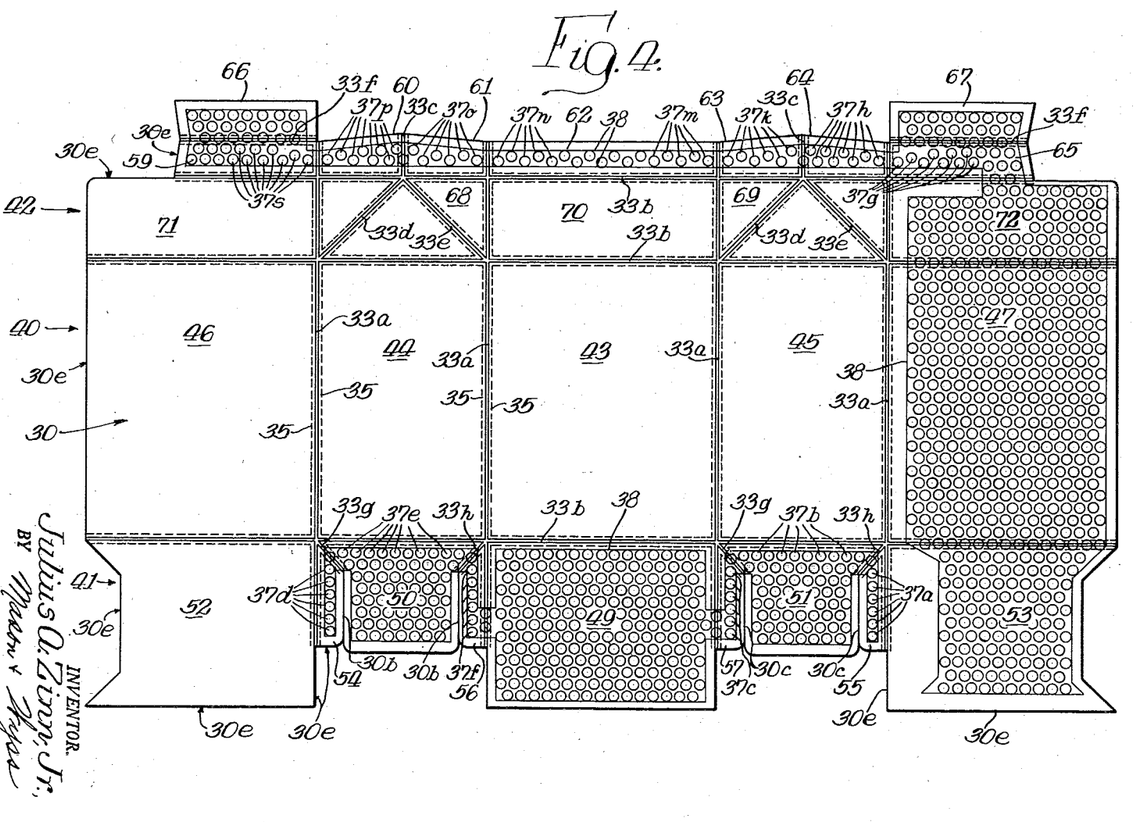
Fig. 4 is a plan view illustrating a packaging blank formed in accordance with the present invention, as seen from the lined side thereof.

While the mode of operation of the present improved apparatus will be partially apparent from the foregoing explanation, certain aspects thereof will best be understood by reference to the plan views of the backing and lining materials illustrated in Figs. 1a, 2a, and 3a of the drawings, which when laid end to end in the order named schematically illustrate the steps performed by succeeding devices of the apparatus, and by reference to the plan view of a completed packaging blank as shown in Fig. 4 of the drawings. In order clearly to indicate the positional relationship between the areas operated upon at successive stages of the machine and the boundaries of the completed blanks, the blank boundaries 30a have been shown in dashed lines immediately beneath each device in Figs. 1, 2, and 3 at which an operation is performed upon one of the two stock materials. For purposes of clarity, only the particular operation performed at any given stage of the machine is shown in that portion of Fig. 1a, 2a, or 3a which is disposed immediately below the stage as shown in Fig. 1, 2, or 3. It will be understood that in actual practice the blanks are formed edge to edge longitudinally of the stock materials in order to avoid material waste. In the interests of clarity, however, they have been shown in spaced apart relationship longitudinally of the stock materials.

As will be evident from an examination of the identified figures and the following detailed description of the completed packaging blank, the blanks are progressively formed two or more at a time at succeeding operational stages of the apparatus. As shown, each device simultaneously performs the operations required in the making of two blanks. It will be understood, however, that with a machine of adequate capacity and stock materials of adequate width, four or more blank forming operations may simultaneously be performed transversely of the stock materials at each stage of the machine. It will also be apparent from the manner in which the blank boundaries are laid out along the stock materials that the blanks are formed lengthwise of these materials, such that when the blanks are folded into package form, the long fibers of the backing material extend around the package sides to lend rigidity and strength to the package structure.

Figure 7:
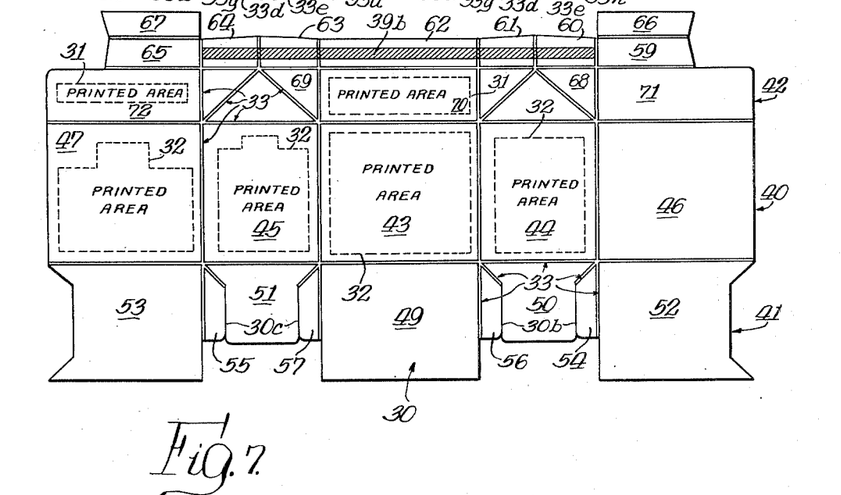
Fig. 7 is a plan view of the completed blank as seen from the backing material side thereof.
Figures 10, 11, 12, 13, 14:
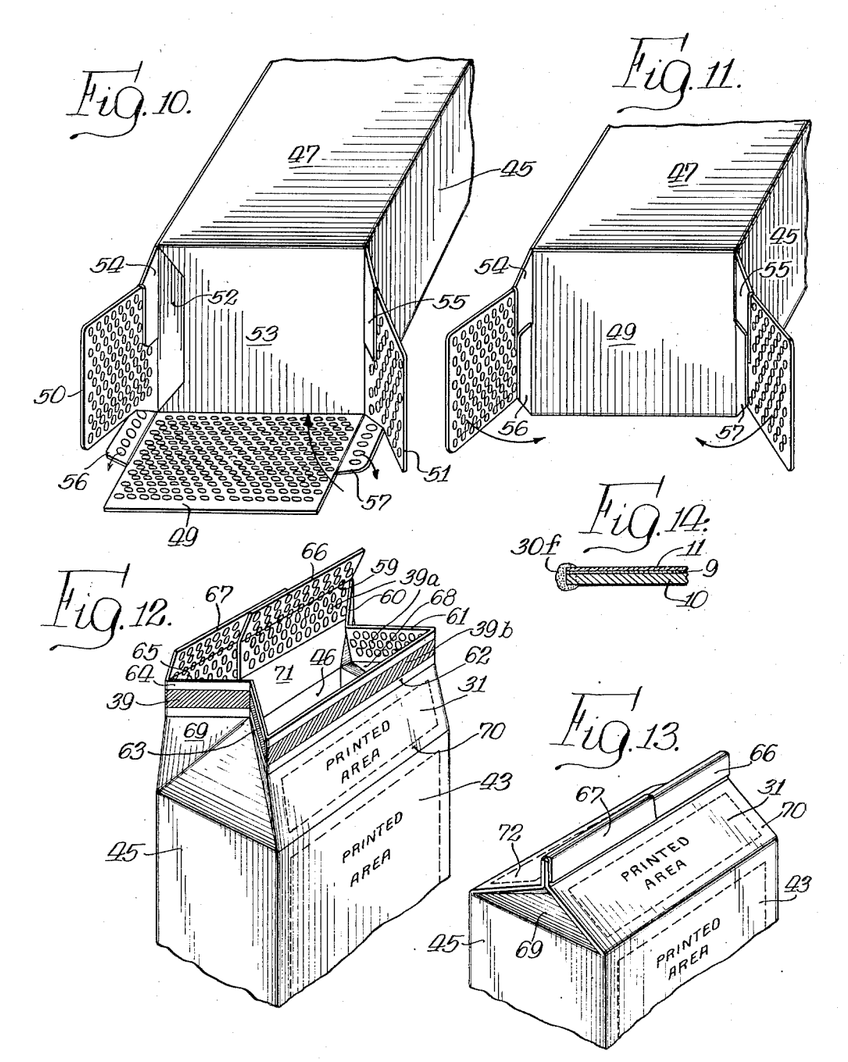
Figs. 10 and 11 are fragmentary perspective views illustrating certain steps which are successively performed in forming the bottom end closure of the package.
Figs. 12 and 13 are fragmentary perspective views illustrating successive steps in the formation of the top closure of the package.
Fig. 14 is a fragmentary sectional view illustrating the manner in which certain edges of the blank, shown in Figs. 4, 5, 6, and 7, are sealed against liquid penetration.

Referring now more in detail to the specific operations performed on the backing material 10 prior to lamination of this material with the lining material 11, it is pointed out that in the perforating device 12, edge perforations 29 are continuously formed along opposite edges of the sheet stock for later engagement with the teeth of the feeding sprockets of the succeeding devices in the manner explained above. In the printing device 13, segmental portions of the rectangular areas 31 are printed in one color within the boundaries 30a of a pair of blanks. As best shown in Figs. 7, 12, and 13 of the drawings, the segmental portions of the area 31 of each blank fall upon the top closure panels 70 and 72 of the completed package. In the printing device 14, different predetermined areas 32 within the boundaries 30a of the pair of blanks are printed, at least over certain portions of these areas. By reference to Fig. 7 of the drawings, it will be noted that this printing is disposed within the confines of the side panels 43 and 47 of the completed package. It will be understood that ordinarily different color printing is employed at the stages 13 and 14, since otherwise, a single printing stage might be used. It will also be understood that if printing in other colors is required, additional printing stages may be employed to take care of additional colors.

In passing through the scoring device 15, score lines 33 are produced by the scoring rolls 15a within the boundaries of the two blanks 30a. By particular reference to Fig. 4 of the drawings, it will be seen that the score lines produced within the boundaries of each blank comprise four lines 33a extending from the top to the bottom of the blank, three lines 33b extending throughout the length of the blank, two pairs of angularly disposed lines 33g and 33h which are provided to facilitate formation of the bottom package closure in folding the blank into a package, and four pairs of lines 33c, 33d, 33e, and 33f which serve to facilitate formation of the top closure structure in folding the blank into a package. As will be apparent from the following explanation with reference to the manner of forming the blank into a package, excepting three steps, all folding steps required in forming the top and bottom closure structures of the package involve bending the blank about the described score lines in such a direction that the outside of each bend is at the outer backing material side of the blank. On the other hand, the bends made along the score lines 33c, 33d, 33e, 33g, and 33h involve reverse bending of the stock in forming the blank into a package. In accordance with one feature of the present invention, the forming dies of the scoring rolls 15a are so mated that all of the score lines 33a, 33b, 33c, and 33f are formed by pressing the backing material 10 downward from the top surface thereof along the identified lines, whereas the score lines 33c, 33d, 33e, 33g, and 33h are formed by pressing the backing material 10 upward from the bottom side thereof as viewed in Fig. 1 along the last-mentioned score lines. In this way, the score line depressions are such that each and every folding operation involved in forming the blank into a package is effected by bending the backing material of the blank around the score line depressions. This has the effect of minimizing the likelihood of tearing the backing material of the blank as the folding operations involved in forming the blank into a package are performed.

Figure 8:
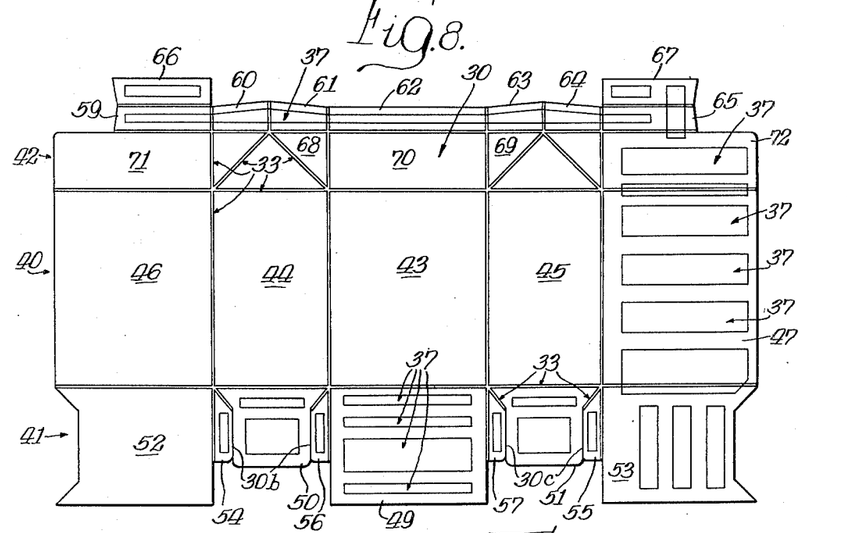
Fig. 8 is a plan view of a completed blank as seen from the lining material side thereof, illustrating a different mode of perforating the lining material of the blank.
Figure 9:
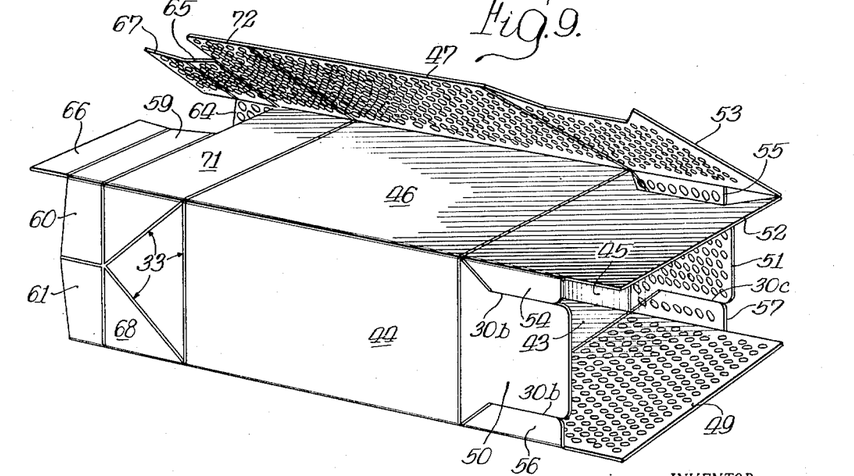
Fig. 9 is a perspective view illustrating one of the first steps involved in forming the blank, shown in Figs. 4, 5, 6, and 7, into a package.

In order to facilitate an understanding of the particular manner in which the adhesive material required to laminate the backing material 10 and the lining material 11 is applied to the underside of the backing material over only predetermined surface areas of this material, the operations which are performed on the lining material 11 in advance of bringing this material into engagement with the backing material 10 for lamination in the device 19 should first be considered. Briefly, as the lining material 11 is withdrawn from the supply reel 11a, it is first fed between the perforating rolls 17a of the edge perforating device 17 to form the edge perforations 36 along the opposite edges thereof which are employed to insure positional tracking of the lining material with the backing material 10 in the manner explained above. From the edge perforating device 17 the lining material 11 is fed into the blank perforating device 18 where it is perforated as indicated at 37 within the boundaries of each packaging blank only within the confines of the border lines 38. These border lines are within the areas of the blank which are brought into facing engagement and adhered together in forming the blank into a package. The particular configuration and size of the perforations 37 is of no importance. For example, the perforations may be in the form of small round holes as predominantly shown throughout the various figures of the drawings. Alternatively, the perforations 37 may be in the form of elongated slots of rectangular configuration, as shown in Fig. 8 of the drawings. While the particular configuration of the perforation openings is of no importance, the positional relationship of certain of these openings with respect to each other is of great importance. Thus, the purpose of providing such openings is to permit direct adherence of facing segments of the backing material together through the perforation openings as the completed blank is formed into a package. Over those areas of the blank where two thicknesses of the lining material are sandwiched between overlapped portions of the backing material in forming the blank into a package, it is necessary, in order to realize the desired end of obtaining a direct adhesive connection between the overlapped segments of backing material, to so position the perforation holes 37 that the holes through the two engaging layers of lining material are in registry. In constructing a blank of the character shown in Fig. 4 of the drawings which is adapted to be formed into a package of the type shown in Figs. 9 through 13 of the drawings, this requirement of perforation hole registry involves the perforation holes 37a, 37b, 37c, 37d, 37e, 37f, 37g, 37h, 37k, 37m, 37n, 37o, 37p, 37s. More specifically, the perforation holes 37a and 37c are adapted to register with the perforation holes 37b when the blank is formed into a package. Similarly, the holes 37d and 37f are so positioned as to register with the holes 37e as the bottom closure parts of the blank are folded and overlapped incident to formation of the blank into a package. As regards the top closure parts of the blank, the perforation holes 37g and 37h are so positioned as to register with each other, the holes 37k and 37m are likewise positioned to be brought into registry. At the other end of the top closure structure, the holes 37h are adapted to register with the holes 37o and the holes 37p are arranged to be brought into registry with the holes 37s. Further, each of the score lines 33c, 33g, and 33h and the right end of the upper score line 33b has a perforation hole 37 centered thereover in the lining material 11 of the blank. Aside from the described positional arrangment of certain of the perforation holes, it is pointed out that all perforation holes are marginally spaced back from the boundaries of those areas of the blank which are overlapped and adhered together in forming the blank into a package. This is clearly illustrated in Fig. 5 of the drawings, wherein the perforated areas within the dashed lines 38 are shown in superimposed relationship with the areas of the lining material side of the completed blank to which the adhesive is applied for the purpose of adhering overlapped parts of the blank together as the blank is formed into a package. The purpose of thus marginally spacing the outer boundaries of the perforated areas of the lining material back from the boundaries of the blank to which adhesive is applied during the package forming operation, is that of insuring a continuous adhesive seal along these marginal strips which separate the perforated lining material areas from the inside of the formed package. This seal serves the purpose of rendering the package siftproof and preventing a liquid with which the package may be filled from penetrating the outer backing material by way of the perforation holes. It will be understood that precision cutting of the perforation holes 37 through the lining material 11 within the described predetermined areas of the boundaries of each blank is obtained by careful design of the cutting dies with which the perforating rolls 18a of the device 18 are equipped. It will also be understood that by appropriate design of these dies, any desired perforation pattern peculiarly adapted to the requirements of any particular type of laminated blank may readily be obtained.

With the above description pertaining to the lining material perforating step in mind, the particular manner in which the adhesive material is stenciled onto the under surface of the backing material 10 over predetermined areas within the boundaries of each packaging blank becomes more readily apparent. Specifically, if a non-stretchable lining material 11, such as aluminum foil is used and a non-thermoplastic adhesive material is to be employed in adhering the lining material to the backing material 10, all areas within each blank boundary are coated with the adhesive material excepting those areas which are brought into registration with the perforations 37 through the lining material 11 in the laminating device 19, and those narrow strips extending along each side of the score lines 33. More specifically, the design of the adhesive stenciling surfaces with which the rolls 16a of the device 16 are equipped is such that all surfaces of the blank 30 as shown in Fig. 4 of the drawings, are adhesively coated excepting those surfaces which are to be exposed through the lining material perforations 37 and excepting those narrow strips bounded by the margin lines 35 between which the score lines 33 are located. Preferably the margin lines 35 are spaced from the edges of the adjacent score lines a distance which may range from one-sixteenth to one-eighth of an inch. The purpose of thus excluding the score lines and adjacent strip zones in applying the adhesive material to the backing material is to prevent adherence of the lining material 11 to the backing material 10 over these zones, with the result that in the completed blank those portions of the lining material which overlie the score lines of the backing material are freely movable relative to the backing material and hence are not subjected to sharp bending and excessive strains as the completed blank is folded into package form. The purpose of excluding the areas of the backing material which register with the lining material perforations 37 in applying the adhesive material to the backing material is that of preserving clean backing material surfaces to which adhesive material may be applied to the blank as a preliminary step in forming the completed blank into a package and to which the thermoplastic adhesive material may be applied at the stages 20 and 22 over the blank areas 39a and 39b in the manner explained below. It is not desirable to coat these surfaces of the backing material with the adhesive employed in the laminating step, allow these adhesive coated surfaces to set, and then re-coat the same surfaces with a second adhesive material during the package forming operation for the reason that it is difficult to obtain a rigid bond which will not peel between the adhesive material applied during the package forming step and the adhesive material applied immediately before the laminating step. Further, exposure of the unset adhesive material through the perforations 37 of the lining material merely complicates the laminating step in that it introduces the problem of preventing the adhesively coated backing material from adhering to the lower laminating roll 19a through the perforations in the lining material.

As will be evident from the preceding paragraph, the laminating rolls 19a serve the function of firmly pressing together the backing material 10 and the lining material 11 so that the lining material is adhered to the backing material over those areas of the backing material which are coated with the adhesive material in the described adhesive stencilling step. In this regard, it is pointed out that engagement of the sprocket wheels 19b with the edge perforations 29 and 36 of the two materials 10 and 11 is relied upon to bring the blank boundaries of the lining material and the backing material into perfect registry as the laminating step proceeds. After passing between the laminating rolls 19a, the laminated stock is passed around the idling cooling rolls 19d and 19e in the order named. These rolls, which may be maintained at a relatively low temperature by circulating a liquid coolant therethrough, serve to set the adhesive bond between the two materials 10 and 11 over the areas of each packaging blank. In this regard it is noted that a glue type of adhesive will ordinarily be employed in the stencilling device 16, which is maintained in a fluid condition through the application of heat thereto, and hardens or sets when cooled down to a predetermined temperature.

After passing around the lower cooling roll 19e, the laminated stock passes between the stencilling rolls 20a of the thermoplastic applicator device 20. These stencilling rolls perform the function of applying a thermoplastic type of adhesive material to the area 39a within the boundaries of each blank. Known types of thermoplastic applicators conventionally function to apply adhesive materials to the lowermost surface of the stock worked upon. It will be understood, therefore, that the surfaces 39a are actually disposed on the lower surface of the lining material 11. It will also be understood from the following explanation that application of the thermoplastic adhesive material to this particular area of each blank is required in order to bond certain top closure parts of the blank together as the blank is formed into a package. Upon leaving the device 20, the laminated stock passes through the stock turning and pulling device which performs the function of reversing the sides of the stock so that the lining material 11 faces upward and the backing material 10 faces downward during continued movement of the laminated stock through the devices 22, 23, and 24. Preferably, the turning device 21 is of the type which twists the laminated sheet stock through 180 degrees longitudinally of the stock. It will be understood that when the twisting type of turning device is employed, a substantial length segment of the stock must be encompassed within the ends of the turning device in order that the stock may be turned without danger of tearing the same or breaking the adherent bond between the two laminated materials. Due to the substantial length of travel of the stock material through the turning device 21, the thermoplastic adhesive material applied to the area 39a of each blank in the applicator device 20 has an opportunity to cool and set before the laminated stock is again passed between a set of operating rolls. If desired, the thermoplastic material setting operation may be accelerated by blowing cool air over the zones 39a as the laminated stock passes between the two devices 20 and 21.

From the stock turning device 21 the laminated stock passes into the thermoplastic applicator device 22 wherein the area 39b within the boundaries of each blank 30a are coated with the same thermoplastic adhesive material as is used in the applicator device 20. It will be noted that the areas 39b register with the areas 39a but are on the opposite side of the laminated stock. More specifically, the device 22 functions to stencil the thermoplastic adhesive material upon the laminated stock at the under side thereof, i. e., to the surface of the backing material on which the printing operations are performed. This thermoplastic adhesive coating over the area 39b of each blank, like that applied to the area 39a of each blank, is utilized to seal certain top closure parts of the blank together in forming the top closure structure of the package after the package is filled. Upon exiting from the applicator device 22, the thermoplastic adhesively coated areas 39b may be passed through streams of cool air for the purpose of setting the thermoplastic material before it enters the blank cutting device 23.

In passing through the blank cutting device 23, the cutting rolls 23a function to cut the laminated stock material along the boundary lines of each pair of blanks and also along the lines 30b and 30c which extend upwardly from the respective bottom edges of the blanks. The cutting dies also cut the laminated stock along the lines 30d in order to sever the blanks of each pair from each other. It is specifically noted that the upper roll 23a in the cutting device 23 is equipped with the cutting elements which penetrate the laminated stock in a downward direction to effect cutting of this stock along the boundaries of the blanks and the described lines 30b, 30c, and 30d. Thus, the relatively thin lining material 11 is cut through before the cutting knives penetrate the relatively thick backing material 10. This method of cutting the blanks is of great importance since it insures clean cutting of the thin and relatively hard lining material all the way through along all severance lines and hence precludes stripping of this material from the backing material 10 when the laminated stock progresses between the stripping rolls 24a of the blank stripping and pulling device 24.

Upon entering the stripping device 24, the stripping rolls 24a function to strip the completed blanks from the laminated stock, allowing each blank 30 to fall downward onto the conveyer belt 25a of the conveyer 25 through appropriate openings in the bottom housing of the stripping device 24 and the top housing of the conveyer 25. If required, high velocity air jets directed against the upper side of the laminated stock after leaving the stripping rolls 24a may be employed to assist gravity in severing the completed blanks 30 from the laminated stock material. Upon exiting from the stripping device 24, the laminated stock scrap which remains after the completed packaging blanks are stripped from the laminated stock may be rolled into a roll 28 of convenient form for handling in shipment to purchasers of such stock.

Preferably, the conveying device 25 is of the intermittently operated type, such that the conveyer belt 25a thereof is moved in step-by-step fashion at discrete time intervals to convey the stocks of completed blanks out of the conveyer 25 to an edge impregnating stand. Each period during which the conveyor belt 25a is at rest is sufficient to permit a predetermined number of completed blanks 30 to be stripped from the laminated stock and to pile up on the conveyor belt. Thus the blanks are conveniently stacked for handling during the edge sealing operation.

As will be evident from the foregoing explanation, the relative disposition of the various devices 13 to 24, inclusive, in terms of the particular points in the described blank making process at which they perform their respective operations, is of the utmost importance. Thus, commercially available printing devices of the roll type suitable for use in the printing stages 13 and 14 are conventionally of the top applicator type, whereas commercially available adhesive stencilling devices of the character employed at the applicator stages 16, 20, and 22 are usually of the bottom applicator type. On the other hand, scoring and blank cutting devices of the character employed at the stages 15 and 23 are commercially available which operate upon either or both of the top and bottom surfaces of the stock material passed therethrough. Hence, it is possible to perform all preliminary operations on the backing material 10 without turning the material over, i. e., without reversing the sides thereof in the manner performed by the device 21. Moreover, by performing the preliminary operations on the lining material 11 and feeding this material in along the bottom surface of the backing material 10, it becomes unnecessary to reverse the sides of the backing material 10 (while the adhesive material is in a fluid state) between the stencilling device 16 and the laminating device 19. Also, by employing the thermoplastic applicator device 20 to coat the areas 39a of each pair of blanks immediately after the laminating step is completed, conventional bottom applicator type of applicator devices 20 and 22 may be employed while at the same time requiring only a single stock turning device 21 in the apparatus. In positioning this turning device between the two applicator devices 20 and 22, the laminated stock is not only conditioned for the bottom application of thermoplastic material to the areas 39b of each pair of blanks, but in addition, the previously coated areas 39a are permitted to set and the stock is placed in the proper position for blank cutting first through the lining material and then through the backing material to achieve the advantages described above. Thus the present improved apparatus is arranged in an entirely unique manner to provide for continuous production of the laminated blanks of unique construction on a production basis while obtaining all of the advantages described above and without any operator intervention.

The next step in the production of the completed blanks is that of impregnating certain edges of each blank with an air-drying sealing material or compound over only those edges thereof which are adapted to be exposed to the package contents when the blank is formed into a package and filled. As will be evident from the following description of the mode of forming the blank into a package, only those edges identified at 30e in Fig. 4 of the drawings are adapted to be exposed to the package contents and hence require impregnation with a sealing material to prevent liquid penetration of the backing material 10. Conveniently, the blanks may be edge impregnated in stacks as they are delivered by the conveyer 25 to an edge impregnating station, not shown. At this station, the stacks of blanks are manually removed from the conveyer belt 25a and with the edges of all blanks in each stack in registry are compressed by means of a ram press or the like. Preferably, the pressing head of the press should be suitably designed so that in compressing the stack of blanks, the score lines of the blanks are not compressed and the edge 30e of the stacked blanks are marginally spaced from points or surfaces to which the pressing forces are applied. The latter feature is desirable since it permits some penetration of the sealing compound between the balnks, such that the compound may completely seal over the edge surfaces of the blanks and effectively form sealing clips. With a stack of blanks compressed in the manner just described, the sealing compound may either be applied to the edges 30e by spraying or brushing as desired. Preferably, an air-drying liquid sealing compound, such, for example, as Glyptal, having good qualities of stock penetration, is employed in sealing the blank edges. The character of the seal produced is illustrated in exaggerated form in Fig. 14 of the drawings. As there shown, the sealing material penetrates the backing material 10 for an appreciable distance inward from the edge 30e and upon drying effectively forms a clip 30f which binds the edge of the lining material 11 to the adjacent edge of the backing material 10 to prevent separation of these two materials along the edges 30e of the blank. After a stack of blanks is edge coated with the sealing material along the edges 30e in the manner just explained, they are immediately removed from the press and separated before the sealing material sets, thereby to permit air-drying of the sealing material without adherence of two or more blanks together. Following this operation, the blanks may be restacked and packaged in flat form for shipment.

From the preceding explanation, it will be understood that the novel method and apparatus herein disclosed, while not limited thereto, are well adapted for use in the continuous production of laminated packaging blanks adapted to be formed into packages characterized by the novel features disclosed and claimed in applicant's prior Patent No. 2,412,666, granted December 17, 1946. As there described and again referring more particularly to Fig. 4 of the drawings, each blank 30 comprises a main body portion 40, a bottom closing portion 41, and a top closing portion 42. The body portion of the blank comprises a side wall panel 43, end wall panels 44 and 45, and side panel members 46 and 47 which are arranged to be adhesively joined to form a two-ply side wall panel of the character illustrated in Figs. 10 and 11 of the drawings. The bottom closing portion 41 of the blank comprises a side flap member 49, end flap members 50 and 51, and side flaps 52 and 53 which are arranged to be overlapped and adhesively joined to form a two-ply flap of the character illustrated in Figs. 10 and 11 of the drawings. The side flap members 52 and 53 are respectively provided with integral side wings 54 and 55 respectively separated from the end flap members 50 and 51 along the severance lines 30b and 30c. Similarly, the side flap member 49 is provided along opposite ends thereof with integral wing parts 56 and 57 which are separated from the adjacent end flap members 50 and 51 along the severance lines 30b and 30c. Each of the side and end flap members 49, 50, 51, 52, and 53 is effectively hinged to the body portions 40 of the blank along the lowermost score line 33b. Similarly, the side flap member wing parts 54, 55, 56, and 57 are effectively hinged to the side flap members 52, 53, and 49, respectively, along the vertical score lines 33a. These wings are foldably hinged to the end flap members 50 and 51 along the score lines 33g and 33h, which, as shown, extend from the upper ends of the severance lines 30b and 30c to the adjacent points of intersection between the respective adjacent score lines 33a and 33b. The described score lines 39g and 33h are disposed at 45 degree angles with respect to the score lines 33a and 33b.

The parts forming the top closing portion 42 of the blank are formable into a bellows-fold type of top closure and comprise end wall parts 68 and 69 provided with the score lines 33d and 33e for facilitating formation of the bellows-folds, a side wall part 70, and side wall members 71 and 72 which are arranged to be adhesively joined to form a two-ply upper side wall in forming the blank into a package. The side and end wall parts of the top closure blank portion 42 are respectively provided with mouth closing panels 59, 60, 61, 62, 63, 64, and 65 which are arranged to be folded and brought together in the manner explained below to form an upstanding and elongated mouth structure of the character shown in Fig. 13 of the drawings. The mouth closing panels 59 and 65 are respectively provided with extended tab wings 66 and 67 arranged to be adhesively joined to form a folding flap which encloses the elongated mouth structure of the package in the manner illustrated in Fig. 13 of the drawings. As will be evident from inspection of Fig. 4 of the drawings, the panels 68, 69, 70, 71, and 72 are hingedly connected to the main body portion 40 of the blank by means of the middle score line 33b. The mouth closing panels 59, 60, 61, 62, 63, 64, and 65 are hingedly connected to the blank parts 71, 68, 70, 69, and 72 by means of the upper score line 33b. Vertically, the top closure parts of the blank are hingedly connected by means of the vertically extending score lines 33a. Inward folding of the end panels 68 and 69 and connected mouth closing panels 60, 61, 63, and 64 is facilitated by the vertical score lines 33c which extend vertically downward from the top edge of the blank to the points of intersection of the score lines 33d and 33e. The score lines 33f serve hingedly to connect the folding tabs 66 and 67 to the mouth closure panels 59 and 65, respectively. As previously described, all of the score lines with the exception of the lines 33c, 33d, 33e, 33g, and 33h face inwardly, i. e., bulge upwardly from the lining material side of the blank. The identified score lines, on the other hand, extend in the reverse direction, i. e., bulge outwardly from the printed surface of the blank. Also, and as previously pointed out, the lining material lamination of the blank is perforated over those areas thereof, illustrated in Fig. 4 of the drawings, which are adapted to be brought into facing engagement and adhered together in folding the blank into a package, with certain of the perforations being adapted to be brought into registry as certain of the folding operations are performed. Further and as explained above, the lining material lamination of the blank is not adhered to the backing material lamination within the strips defined by the margin lines 36 on either side of each score line.

Figures 5, 6:
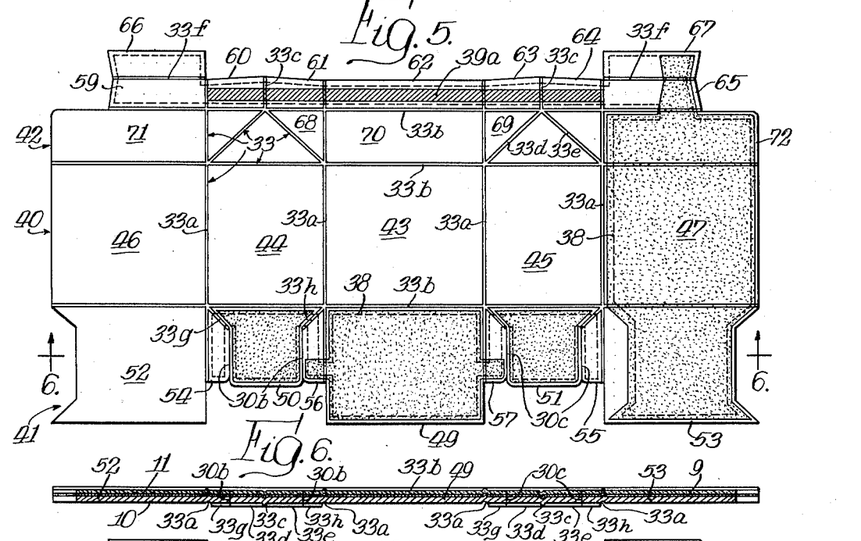
Fig. 5 is a plan view of the blank shown in Fig. 4 illustrating the surface areas of the blank to which an adhesive material is applied prior to formation of the blank into a package.
Fig. 6 is a sectional view taken along the line 6—6 in Fig. 5, illustrating in exaggerated thickness the laminated structure of the blank.

In forming the described blank into a package in the manner disclosed and claimed in applicant's copending application Serial No. 612,177, filed August 23, 1945, now Patent No. 2,480,176, granted August 30, 1949, the blank is first fed through an adhesive stencilling device similar to that used at the stage 16 of the blank forming process, wherein the liner lamination side thereof is stencilled with an adhesive coating over the stippled areas of the blank as shown in Fig. 5 of the drawings. As previously pointed out, the boundaries 38 within which the liner perforations are confined are marginally spaced inward from the boundaries of the areas to which the adhesive coating is applied in order to insure adhering of an unperforated portion of the lining material to the backing material or another unperforated and facing portion of the lining material incident to the package forming operation. After the adhesive coating is applied to the indicated surfaces of the blank, it is delivered to the forming facilities of a package forming machine where the side and bottom closure structures are made. The first operation performed in this machine is that of wrapping the blank around a forming mandrel to bend the same along the score lines 33a in the manner illustrated in Fig. 9 of the drawings until the adhesively perforated lining material side of the blank parts 67, 65, 72, 47, and 53 is brought into facing engagement with the backing material side of the parts 66, 59, 71, 46, and 52, respectively. By a suitable pressure application, the identified facingly engaged parts of the blank are obviously adhered together, thus completing formation of the side and end wall structure of the package. It will be understood that the backing material laminations of the overlapped parts are directly adhered together through the perforations 37 in the lining material lamination disposed between the two overlapped parts of the backing material.

In forming the bottom closure structure of the package, the two-ply end panel consisting of the adhesively connected blank parts 52 and 53 is first pushed inwardly around the bottom score line 33b into the plane of the bottom end of the package, following which the bottom side panel 49 is folded inwardly along the same score line 33b until it facingly engages the backing side of this two-ply end panel. Incident to these folding operations, the wing parts 54 and 55 of the blank are drawn in with the bottom closure panel to bring the lining material sides thereof into facing engagement with the lining material sides of the end flap members 50 and 51, respectively. This is the first point in the package forming operation at which two lining material sides of the blank are brought into facing engagement and adhered together. However, and as previously pointed out, the lamination perforations 37a and 37d are positioned to register respectively with the liner perforations 37b and 37e. Accordingly, an adhesive bond may be formed through these openings between the facing surfaces of the backing material segments which are exposed to each other through these openings. In similar manner, the lining material perforations 37c and 37f are brought into registry with the lining material perforations 37b and 37e so that the backing material laminations of the wings 56 and 57 may be adhered directly to the backing material parts of the end closure members 50 and 51.

Following the described operation of folding the bottom end panels into place, the end flaps 50 and 51 may be folded over and adhered to the backing material side of the end panel 49. Here again, the perforations in the lining material lamination of the end flaps 50 and 51 insures direct bonding of the backing material lamination of these flaps to the backing material lamination of the panel 45. The bottom end closure structure is completed by bringing a pressing head into engagement with this structure to press the same against the forming mandrel and thus produce an efficient adhesive material bond between all facing parts of the structure. As explained in applicant's prior patent, referred to above, by recessing the end panels 52 and 53 along the opposite edges thereof to provide spaces for accommodating the wing parts 54, 55, 56, and 57, a bottom closure structure is obtained which has substantially uniform multi-ply thickness throughout the entire area thereof. Further, provision of these recesses to accommodate the identified wings of the blank insures that these wings will not interfere with uniformly efficient bonding of the facingly engaged parts of the blank bottom closure portion 41 together as pressure is applied to the overlapped parts of this blank portion to complete the bottom closure operation.

In closing the top of the package, the upper opposed end wall parts 68 and 69 are pushed toward each other to bend the mouth closure parts 60 and 64 toward the overlapped mouth closure parts 59 and 65, and similarly to move the mouth closure panels 61 and 63 inwardly toward the mouth closure side panel 62. Concurrently, the mouth closure parts 62 and 70 and the overlapped mouth closure parts 71, 72, 59, and 65 are moved toward each other. As this operation is completed, the panels 60 and 61 are respectively moved into facing engagement with the panels 59 and 62 with the lining material perforations 37o in registry with the lining material perforations 37n and similarly with the lining material perforations 37p in registry with the lining material perforations 37s. Concurrently, the mouth closure panels 63 and 64 are respectively moved into facing engagement with the panels 62 and 65. Here also, the lining material perforations 37k and 37h are respectively positioned to be brought into registry with the lining material perforations 37m and 37g. Further, those perforations 37 disposed in the center zone of the panel 62 are brought into registry with the perforations 37s disposed at the left end portion of the top closure panel 59.

Thus, direct adhesive bonding of the backing material laminations of the overlapped mouth closing members 59 to 65, inclusive, may be obtained after these panels are brought into facing engagement in the manner described. The final forming operation is that of folding the flap 68 down over the mouth closure panel 62 to bring the perforated lining material side of this flap into facing engagement with the thermoplastic adhesive coated area 39b of the mouth closure panel 62. Heat and pressure may now be applied to the facingly engaged and overlapped mouth closure panels to effect melting of the thermoplastic adhesive materials coating the areas 39a and 39b and thus produce the desired sealing engagement between these panels of the blank. After the thermoplastic adhesive materials have cooled and reset, the pressure may be removed, leaving the engaged parts of the top closure structure bonded together. Thus, formation of the package is completed.

As indicated above, when a non-stretchable metallic film, such as aluminum foil, is used as the lining material 11, it is highly desirable not to bond the lining material to the backing material 10 over the score lines 33. Also, when conventional types of adhesives, such as water-soluble glues, are employed in laminating the lining material to the backing material, it is desirable not to apply the adhesive material to the areas of the backing material which are exposed through the perforation openings 37 of the completed blank. However, if a lining material having reasonable elasticity, such for example, as plastic films of the Pliofilm type, is used, and a thermoplastic adhesive material is employed in laminating the lining material 11 to the backing material 10, the entire surface of each blank area 39a may be covered with the adhesive material, in advance of lamination, at the adhesive stencilling stage 16, such that the lining material is adhered to the backing material over the entire area of the blank and the thermoplastic adhesive material covers the surfaces of the backing material exposed through the perforations 37.

If the last-described method of laminating is employed, the thermoplastic adhesive applicating step performed at the stage 20 of the apparatus may be dispensed with. However, in coating the completed blank over the lining material side thereof preparatory to forming the blank into a package, it is essential that the same type of thermoplastic adhesive material be used, in order that the adhesive material exposed through the perforation openings 37 may be reheated to a plastic state for effective fusion with the second coat of adhesive material. Further, the second adhesive coating step, performed in the package forming machine, should also include coating of the zone 39a with the adhesive material in order that the top closure structure of the package may be formed in the manner explained above.

From the preceding detailed description of the packaging blank 30 and the manner of forming the same into a closed package, it will be understood that the lining material perforations 37 are in each and every instance so positioned as to permit direct adhesive bonding of overlapped backing material parts to each other. At the same time, in each case where a lining material surface is brought into overlapped facing engagement with another lining material surface or with a backing material surface, the two engaged surfaces are adhered together throughout the areas of engagement. The last-mentioned adhesive bonds, i. e., those adhering a lining material surface of the blank either to a lining material or to a backing material surface, serve completely to seal the package internally against leakage through the lining material lamination. On the other hand, the adhesive bonds provided through the lining material perforations 37 effectively function as rivets between the outer backing material laminations, which so strengthen the completed package structure as to prevent separation of the parts adhered together and more important to prevent failure of the adhesive material layer which bonds certain areas of the lining material to each other and also to overlapped areas of the backing material.

It will also be apparent from the preceding explanation that when the lining material 11 is not adhered to the backing material 10 over narrow strip areas centrally embracing the score lines 33, the folding or bending operations required in forming the blank into the package may be performed with minimum likelihood of perforating the lining material at one or more points along these lines inside the package. Thus, the lining material which overlies the score lines is entirely free to move independently of the adjacent segmental areas of the backing material and hence is not subject to the same tension and compressional strains as are imposed upon the backing material in carrying out the described folding operations. Further, all of the edges 33e which are exposed to the contents of the completed package are completely sealed against liquid penetration by the edge seal 30f. Moreover, the boundaries 38 within which the lining material perforations 37 are confined are so marginally spaced from the boundaries of the adhesive material coating employed in forming the blank into a package that each lining material perforation is effectively sealed off by this adhesive material from the inside of the completed package. As a result of these features, the inwardly disposed lining material lamination of the completed package is completely sealed independently of the backing material lamination. In other words, the desired end is achieved of relying solely upon the lining material lamination to completely seal the package and relying upon the backing material lamination to supply the strength and rigidity to the package structure necessary to protect the sealed container afforded by the lining material lamination.

While one embodiment of the invention has been disclosed, it will be understood that various modifications may be made therein which are within the true spirit and scope of the appended claims.

What is desired to be secured by Letters Patent of the United States is:

1. In apparatus for forming sheet backing material and sheet lining material into a laminated packaging blank having certain portions which are adapted to be facingly engaged and adhered together in forming the blank into a package, a perforating device for perforating said lining material within the boundaries of the finished blank over only those areas defined by said certain portions of the blank, a laminating device for bringing said perforated lining material and backing material together and for adhering said materials together and means synchronously moving said lining material and said backing material through said laminating device with said perforated portions of said lining material in registry with the areas of said backing material defining said certain portions of the finished blank.

2. In apparatus for forming sheeting backing material and sheet lining material into a laminated packaging blank having certain portions which are adapted to be facingly engaged and adhered together in forming the blank into a package, a perforating device for perforating said lining material within the boundaries of the finished blank over only those areas defined by said certain portions of the blank, a laminating device for bringing said perforated lining material and said backing material together and for adhering said materials together, a blank cutting device for cutting the blank from the laminated materials along the boundaries with reference to which said perforations are formed in said lining material, and means for synchronously operating said devices to maintain the finished blank boundaries of said materials in registry as said materials move into said laminating device and to cut said laminated materials along said boundaries in said cutting device.

3. Apparatus for continuously forming continuous sheet backing material and continuous sheet lining material into laminated packaging blanks each having certain portions which are adapted to be facingly engaged and adhered together in forming the blank into a package, comprising synchronously operated devices for separately edge perforating said sheet materials along one edge of each material sheet, a plurality of devices for successively performing different operations on said backing material over surface portions of said backing material which bear predetermined positions relative to the boundaries of each finished blank, a perforating device for perforating said lining material within the boundaries of each finished blank over only those areas defined by said certain portions of each finished blank, a laminating device for adhering said lining material and said backing material together and including means operated synchronously with said edge perforating devices and engageable with said edge perforations for bringing the finished blank boundaries of the two materials into registry before said materials are adhered together, a blank cutting device for cutting the blanks from the laminated materials along said finished blank boundaries, and means for synchronously operating said devices on a repetitive basis to effect continuous production of finished blanks by the described progressive stage operations on said materials.

4. Apparatus for continuously forming sheet backing material and sheet lining material into laminated packaging blanks each having certain portions which are adapted to be facingly engaged and adhered together in forming the blank into a package, comprising a plurality of devices for successively performing different operations on said backing material over surface portions of said backing material which bear predetermined positions relative to the boundaries of each finished blank, a perforating device for perforating said lining material within the boundaries of each finished blank over only those areas defined by said certain portions of each finished blank, a laminating device for bringing said perforated lining material and said backing material together with the finished blank boundaries thereof in registry and for adhering said materials together, a blank cutting device for cutting the blanks from the laminated materials along said finished blank boundaries, and means for synchronously operating said devices on a repetitive basis to effect continuous production of finished blanks by the described progressive stage operations on said materials.

5. Apparatus for forming sheet backing material and sheet lining material into a laminated packaging blank having certain portions which are adapted to be facingly engaged and adhered together in forming the blank into a package, comprising synchronously operated devices for separately edge perforating said materials along one edge of each material sheet, a plurality of devices for successively performing different operations on said backing material over surface portions of said backing material which bear predetermined positions relative to the boundaries of the finished blank, a device for perforating said lining material within the boundaries of the finished blank over only those areas thereof defined by said certain portions of the finished blank, a laminating device for adhering said lining material and said backing material together and including means operated synchronously with said edge perforating devices and engageable with said edge perforations for bringing the finished blank boundaries of the two materials into registry before they are adhered together, and a blank cutting device for cutting the blanks from the laminated materials along said finished blank boundaries.

6. In apparatus for forming sheet backing material and sheet lining material into a laminated packaging blank having certain portions which are adapted to be facingly engaged and adhered together in forming the blank into a package, synchronously operated devices for separately edge perforating said backing material and said lining material along at least one edge thereof, means for performing at least one operation on said backing material over a surface portion thereof defined by the boundaries of the finished blank, a device for perforating said lining material within the boundaries of the finished blank only over those areas thereof defined by said certain portions of the finished blank, and a laminating device for adhering said lining material and said backing material together and including means operated synchronously with said edge perforating devices and engageable with said edge perforations for bringing the finished blank boundaries of the two materials into registry before they are adhered together.

7. The method of forming sheet backing material and sheet lining material into a laminated packaging blank having certain portions which are adapted to be facingly engaged and adhered together in forming the blank into a package, which comprises scoring said backing material to produce fold lines thereon within the boundaries of the finished blank, perforating said lining material within the boundaries of the finished blank over only those areas defined by said certain portions of the finished blank, bringing the finished blank boundaries of said materials into registry, adhering said lining material to said backing material over areas which are marginally spaced at least from those fold lines which are to be exposed to the package contents upon formation of the blank into a package, and cutting the resulting laminated structure along said boundaries to form the blank.

8. A continuous method of forming sheet backing material and sheet lining material into laminated packaging blanks each having certain portions which are adapted to be facingly engaged and adhered together in forming the blank into a package, which comprises continuously moving said lining material and backing material in synchronism to produce and maintain registration of those corresponding areas of the lining material and backing material which define the boundaries of finished blanks, perforating said moving lining material within the boundaries of each finished blank only over those areas defined by said certain portions of the finished blank, applying adhesive to said moving backing material only over predetermined portions of each finished blank area which do not register with the perforated areas of said lining material in each finished blank, engaging the moving lining material with the adhesive coated side of the moving backing material to form a laminated structure, and cutting the moving laminated structure along the blank boundaries to form the blanks.

9. A method of continuously forming sheet backing material and sheet lining material into laminated package blanks each having certain liner portions which are adapted to be facingly engaged and adhered together in forming the blank into a package, which comprises continuously moving said lining material and backing material in synchronism to produce and maintain registration of those corresponding areas of the lining material and backing material which define the boundaries of finished blanks, perforating said moving lining material within the boundaries of each finished blank over predetermined areas of said certain portions of the finished blank liner lamination, perforating said moving lining material within the boundaries of each finished blank over other areas of said certain portions of the finished blank lamination which register with said predetermined areas in forming the blank into a package, applying adhesive to said moving backing material only over predetermined portions of each finished blank area which are not adapted to register with the perforated areas of said lining material, engaging the moving lining material with the adhesive coated side of the moving backing material to form a laminated structure, and cutting the moving laminated structure along the blank boundaries to form the blanks.

10. A continuous method of forming sheet backing material and sheet lining material into laminated packaging blanks each having a mouth closure portion and certain other portions which are adapted to be facingly engaged and adhered together in forming the blank into a package, which comprises continuously moving said lining material and backing material in synchronism to produce and maintain registration of those corresponding areas of the lining material and backing material which define the boundaries of finished blanks, perforating said moving lining material within the boundaries of each finished blank only over those areas defined by said portions of the finished blank, applying adhesive to said moving backing material only over predetermined portions of each finished blank area which are not adapted to register with the perforated areas of said lining material, engaging the moving lining material with the adhesive coated side of the moving backing material to form a laminated structure, applying a thermo-plastic adhesive to the perforated liner side of the moving laminated structure over at least a part of the mouth closure portion area of each finished blank, and cutting the moving laminated structure along the blank boundaries to form the blanks.

11. A continuous method of forming sheet backing material and sheet lining material into laminated packaging blanks each having a mouth closure portion and certain other portions which are adapted to be facingly engaged and adhered together in forming the blank into a package, which comprises continuously moving said lining material and backing material in synchronism to produce and maintain registration of those corresponding areas of the lining material and backing material which define the boundaries of finished blanks, perforating said moving lining material within the boundaries of each finished blank only over those areas defined by said portions of the finished blank, applying adhesive to said moving backing materal only over predetermined portions of each finished blank area which are not adapted to register with the perforated areas of said lining material, engaging the moving lining material with the adhesive coated side of the moving backing material to form a laminated structure, applying a thermo-plastic adhesive to both sides of the moving laminated structure over at least a part of the mouth closure portion area of each finished blank, and cutting the moving laminated structure along the blank boundaries to form the blanks.

12. Apparatus for continuously forming sheet backing material and sheet lining material into laminated packaging blanks each having certain portions which are adapted to be facingly engaged and adhered together in forming the blank into a package, which comprises driving means for continuously moving said lining material and backing material in synchronism to produce and maintain registration of those corresponding areas of the lining material and backing material which define the boundaries of finished blanks, a liner perforating device for perforating said moving lining material within the boundaries of each finished blank only over those areas defined by said certain portions of the finished blank, an adhesive applicator for applying adhesive to said moving backing material only over predetermined portions of each finished blank area which are not adapted to register with the perforated areas of said lining material, a laminating device for engaging the moving lining material with the adhesive coated side of the moving backing material to form a laminated structure, and a blank cutting device for cutting the moving laminated structure along the blank boundaries to form the blanks.

13. The method of forming sheet backing material and sheet lining material into laminated packages each having certain portions which are facingly engaged and adhered together, which comprises continuously moving said lining material and backing material in synchronism to produce and maintain registration of those corresponding areas of the lining material and backing material which define the boundaries of finished blanks, perforating said moving lining material within the boundaries of each finished blank only over those areas defined by said certain portions of the finished blank, applying adhesive to said moving backing material only over predetermined portions of each finished blank area which are not adapted to register with the perforated areas of said lining material, engaging the moving lining material with the adhesive coated side of the moving backing material to form a laminated structure, cutting the moving laminated structure along the blank boundaries to form the blanks, applying an adhesive to the perforated liner side of each blank over the area thereof defined by at least a part of said certain portions of the blank, and forming each adhesive coated blank into a package.

14. The method of forming sheet backing material and sheet lining material into laminated packages each having mouth closure portions and certain other portions which are facingly engaged and adhered together, which comprises continuously moving said lining material and backing material in synchronism to produce and maintain registration of those corresponding areas of the lining material and backing material which define the boundaries of finished blanks, perforating said moving lining material within the boundaries of each finished blank only over those areas defined by said certain portions of the finished blank, applying adhesive to said moving backing material only over predetermined portions of each finished blank area which are not adapted to register with the perforated areas of said lining material, engaging the moving lining material with the adhesive coated side of the moving backing material to form a laminated structure, applying a thermo-plastic adhesive to both sides of the moving laminated structure over at least a part of the mouth closure portion areas of each finished blank, cutting the moving laminated structure along the blank boundaries to form the blanks, applying an adhesive to one side of each blank over the area thereof defined by at least a part of said certain portions of the blank, forming each adhesive coated blank into an open package, moving the mouth closure portions of each open package thus formed into engagement, and applying heat and pressure to the facingly engaged mouth closure portions of each package to melt the thermo-plastic adhesive and thus bond the facingly engaged mouth closure portions of the blank together.

JULIUS A. ZINN, Jr.

REFERENCES CITED

The following references are of record in the file of this patent:

UNITED STATES PATENTS

| Number | Name | Date |
|---|---|---|
| 1,597,677 | Everett | Aug. 31, 1926 |
| 2,131,343 | Cordiano et al. | Sept. 27, 1938 |
| 2,144,331 | Fulk | Jan. 17, 1939 |

FOREIGN PATENTS

| Number | Country | Date |
|---|---|---|
| 436,907 | Germany | Nov. 11, 1926 |
| 648,269 | France | Aug. 13, 1928 |
| 766,947 | France | Apr. 23, 1934 |
| 795,268 | France | Jan. 2, 1936 |